US012711316B2

(12) United States Patent
Singh et al.

(10) Patent No.: US 12,711,316 B2
(45) **Date of Patent: *Aug. 18, 2026**

(54) RENDERING CONTENT USING A CONTENT AGENT AND/OR STORED CONTENT PARAMETER(S)

(71) Applicant: GOOGLE LLC, Mountain View, CA (US)

(72) Inventors: Sarvjeet Singh, Palo Alto, CA (US); Gustavo Menezes Ponte Moreira, Sunnyvale, CA (US); Grady Simon, San Francisco, CA (US); Peter Brandt, Palo Alto, CA (US); Tushar Chandra, Los Altos, CA (US)

(73) Assignee: GOOGLE LLC, Mountain View, CA (US)

( * ) Notice: Subject to any disclaimer, the term of this patent is extended or adjusted under 35 U.S.C. 154(b) by 69 days.

This patent is subject to a terminal disclaimer.

(21) Appl. No.: 18/826,929

(22) Filed: Sep. 6, 2024

(65) Prior Publication Data

US 2024/0428004 A1 Dec. 26, 2024

Related U.S. Application Data

(63) Continuation of application No. 17/608,686, filed as application No. PCT/US2019/034359 on May 29, 2019, now Pat. No. 12,086,554.

(Continued)

(51) Int. Cl.

*G06F 40/35* (2020.01)
*G06F 40/40* (2020.01)
*H04L 51/02* (2022.01)

(52) U.S. Cl.

CPC .............. *G06F 40/35* (2020.01); *G06F 40/40* (2020.01); *H04L 51/02* (2013.01)

(58) Field of Classification Search

USPC ................................................ 704/7–10, 257

See application file for complete search history.

(56) References Cited

U.S. PATENT DOCUMENTS 9,817,383 B1 * 11/2017 Sinha ..................... G05B 15/02
2004/0042611 A1 3/2004 Power (Continued)

FOREIGN PATENT DOCUMENTS

CN 102831319 12/2012
CN 105563498 5/2016

(Continued)

OTHER PUBLICATIONS

China National Intellectual Property Administration; Notice of Grant issued in Application No. 201980096007.9; 7 pages; dated Jan. 23, 2024.

(Continued)

*Primary Examiner* — Leonard Saint-Cyr
(74) *Attorney, Agent, or Firm* — Gray Ice Higdon

(57) ABSTRACT

Techniques are disclosed that enable the generation of a content agent based on content parameter(s) determined from an initial user request for content as well as a dialog session to further refine the request for content. Various implementations include using the content agent to render additional content responsive to an additional user request. Additional or alternatively implementations include using the content agent to proactively render content to the user.

18 Claims, 6 Drawing Sheets

Related U.S. Application Data

(60) Provisional application No. 62/843,874, filed on May 6, 2019.

(56) References Cited

U.S. PATENT DOCUMENTS

| | | | |
|---|---|---|---|
| 2011/0231353 A1 | 9/2011 | Wang | |
| 2012/0221502 A1 | 8/2012 | Jerram | |
| 2014/0310001 A1 | 10/2014 | Kalns et al. | |
| 2014/0310002 A1 | 10/2014 | Nitz et al. | |
| 2016/0042735 A1 | 2/2016 | Vibbert et al. | |
| 2018/0329993 A1 | 11/2018 | Bedadala et al. | |
| 2019/0050577 A1 | 2/2019 | Kulagin | |
| 2020/0110560 A1* | 4/2020 | Hariton | G06F 3/1206 |
| 2022/0215179 A1 | 7/2022 | Singh et al. | |

FOREIGN PATENT DOCUMENTS

| | | |
|---|---|---|
| CN | 107636647 | 1/2018 |
| CN | 108090174 | 5/2018 |
| CN | 108132824 | 6/2018 |
| WO | 2018044956 | 3/2018 |

OTHER PUBLICATIONS

Song, J. et al.; Learning-Based Content Caching and Sharing for Wireless Networks; IEEE Transactions on Communications, vol. 65; 16 pages; dated Jun. 8, 2017.

European Patent Office; Communication pursuant to Article 94(3) EPCT issued in Application No. 19735431.9; 14 pages; dated Oct. 26, 2023.

European Patent Office; International Search Report and Written Opinion of Ser. No. PCT/US2019/034359; 15 pages; dated Jan. 2, 2020.

Sun, Y. et al.; "Conversational Recommender System;" Cornell University, arXiv.org, arXiv:1806.03277v1; 10 pages; Jun. 8, 2018.

Wärnestål, P. et al.; "Interview and Delivery: Dialogue Strategies for Conversational Recommender Systems;" 16th Nordic Conference of Computational Linguistics NODALIDA 2007 Conference; 7 pages; dated 2007.

Li, R. et al.; "Towards Deep Conversational Recommendations;" 32nd Conference on Neural Information Processing Systems (NeurIPS 2018); 11 pages.

* cited by examiner

RENDERING CONTENT USING A CONTENT AGENT AND/OR STORED CONTENT PARAMETER(S)

BACKGROUND

Humans may engage in human-to-computer dialog with interactive software applications referred to herein as "automated assistants" (also referred to as "digital agents", "chatbots", "interactive personal assistants", "intelligent personal assistants", "assistant applications", "conversational agents", etc.). For example, humans (which when they interact with automated assistants may be referred to as "users") may provide commands and/or requests to an automated assistant using spoken natural language input (i.e., utterances), which may in some cases be converted into text and then processed, and/or by providing textual (e.g., typed) natural language input. An automated assistant responds to a request by providing responsive user interface output, which can include audible and/or visual interface output.

A user can interact with an automated assistant and/or other application(s) to request a variety of digital content including: video, audio, images, web pages, news articles, videos, recipes, blog posts, electronic books, memes, social media posts, and/or additional types of content.

SUMMARY

Implementations described herein are directed towards generating a content agent using content parameters determined from a user request, and content parameters determined during a dialog session between a user and a client device. As described herein, the dialog session between the user and the client device, that follows the user request, can be initiated and/or guided by an application of the client device (optionally interfacing with remote application component(s)). The application can be, for example, an automated assistant described in more detail herein. Moreover, prompts provided during the dialog session can be generated by the application based on feature(s) of an initial corpus of content that is responsive to the user request and can be generated with the goal of restraining that initial corpus of content to thereby limit a quantity of content that is considered in determining which content to be rendered by the content agent responsive to the user request and/or responsive to future rendering of content by the content agent (proactive and/or responsive to future user request(s)). In these and other manners, the quantity of content items that are considered by the content agent can be reduced, resulting in more computationally efficient consideration and selection of content to be rendered. Further, in various implementations the initiation of the dialog session in seeking to restrain the initial corpus of content can be selective and occur only responsive to determining one or more condition (s) are present. Such condition(s) can include, for example, the initial corpus of content items including at least a threshold quantity of content items, the initial corpus of content items (and/or an associated index) being at least a threshold storage size, and/or other condition(s). In these and other manners, the dialog session can be only selectively initiated to thereby balance the computational efficiencies conserved through constraining the corpus of content, with the resources required to engage in the dialog session. The efficiency of user interaction with and control of the client device can therefore be improved, reducing both friction between the user and the client device responses and reducing computational overheads.

In many implementations described herein, the generated content agent and its associated content parameters is persistent and continues to selectively render, at multiple disparate times across multiple disparate sessions, content from the corpus as constrained by the determined content parameters. Through persistence of the content agent and/or content parameters, subsequent requests and dialog sessions to again establish the content parameters can be avoided (along with their associated usage network and/or computational resources). Moreover, as new content items that conform to the content parameters are added to the corpus, the content agent can selectively initiate a new dialog session to establish additional content parameters. Prompt(s) provided during the new dialog session can optionally be generated based on feature(s) of these new content items (e.g., feature(s) not previously present in content items of the corpus) to determine whether to restrict or include such new content items from the corpus. This enables the corpus to continue to be constrained, and the dialog session can optionally be initiated prior to provision of any new content items to prevent the rendering of content items not sought by the user. Further, the dialog session can optionally be selectively initiated responsive to presence of condition(s) (e.g., those mentioned above), thereby balancing dialog session resource requirements with resource savings obtained through a constrained corpus.

As one example of some implementations, a user can request "show me how to set up my router". One or more initial parameters can be determined from the initial request of "show me how to set up my router", such as the initial content parameters of "set up" and "router". A dialog session can be initiated with the user via the client device to refine the request for content. An example dialog session initiated after the request of "show me how to set up my router" can include: client device-"what brand is your router"; user-"hypothetical router brand"; client device-"what model is your router"; user-"hypothetical Model number"; client device "are you having trouble with a specific step of setting up your router"; user-"No". Further content parameters can be determined from this dialog session, such as "hypothetical router brand", "hypothetical model number", "all set up steps", and additional and/or alternative content parameter (s). The initial content parameter(s) (e.g., set up, router) can be used to identify a corpus of content responsive to the initial request. Additionally or alternatively, the further content parameters (e.g., hypothetical router brand, hypothetical model number, all set up steps) can be used to refine the corpus of content. In many implementations, the further content parameters can be used to refine the corpus of content by, for example, restricting the number of content items in the corpus of content. In a variety of implementations, the content agent can be generated based on the initial parameters associated with the request, as well as the further content parameters determined based on user input during the dialog session. Content parameter(s) can additionally or alternatively be determined based on whether and/or how a user interacts with an item of content. For example, if a user selects (e.g., through touch input) an item of content relating to a particular router model, the system can infer the user likely has that model of router and determine content parameter(s) relating to the type of router. As another example, the system can determined content parameter(s) relating to the type of router if a user select(s) multiple items of content relating to the particular router model and/or views the items of content for at least a threshold duration of time.

A content agent can be used in rendering one or more items of content in a corpus of content corresponding with the content agent. In various implementations, a user provides an additional request for content (where the content requested by the additional request for content is included in the corpus of content), and the content agent can be used to determine an item of content in the corpus of content responsive to the additional request. For example, a recipe content agent can be generated based on an initial request for content and/or dialog session for the request of "show me a dinner recipe". The recipe content agent can be used in determining an item of content when the user makes a subsequent request of "show me a breakfast recipe". The subsequent request can be made at a variety of times following the initial request including: the subsequent request is made in the same dialog session as the initial request; the subsequent request is made later in the same day as the initial request; the subsequent request is made the day after the initial request; the subsequent request is made a week after the subsequent request; and/or the subsequent request is made an additional length of time following the initial request.

Additionally or alternatively, a content agent can be used in proactively rendering an item of content to the user. For example, the recipe content agent described above can be used to proactively render an additional recipe when the user is interacting with the client device at an additional instance of time. Proactive content can be rendered using the content agent at a variety of times including: in the same dialog session as the initial request; in the next dialog session; the day after the initial request; the week after the initial request; and/or additional lengths of time.

In many implementations, content parameters used in generating a content agent (i.e., content parameters determined from an initial request and/or content parameters determined from a subsequent dialog session) are used to refine content in additional and/or alternative corpora of content. For example, a content parameter of "allergic to peanuts" can be determined when generating a restaurant selection content agent. In many implementations, the content parameter (i.e., allergic to peanuts) can be used in generating and/or refining additional and/or alternative content agent(s). For example, the allergic to peanuts content parameter can be used to refine the corpus of content related to a recipe content agent. In other words, a user's allergy to peanuts (allergic to peanuts content parameter) used in generating a first content agent (the restaurant selection content agent) can proactively be used in generating a second content agent (the recipe content agent). Additionally or alternatively, content parameter(s) can optionally change over time, such as content parameter(s) decaying over time. In other words, a content agent can be updated by lessening the impact of one or more content parameters over time and/or removing one or more content parameters over time. As one example, a content parameter indicating a preference for spicy food can be determined from an initial request of "I'm in the mood for spicy food". The content parameter indicating the preference for spicy food can decay over time if there is no reaffirmation of the preference (e.g., reaffirmation through selection of a "spicy food" content item and/or another request for spicy food). The content agent can be updated such that, over a period of time (e.g., a day, a week, a month, and/or additional lengths of time) spicy food recommendations can be removed from the corpus of content associated with the content agent.

New content can be added to a corpus of content over time. As used herein, new content indicates: content not originally included in the corpus of content; content created after determining the corpus of content; content within the corpus of content a user has not interacted with (e.g., an unwatched video, an unread article, and/or additional content the user has not interacted with); and/or additional content new to the user. In many implementations, user interaction with content can include selecting, selecting and view for at least a threshold duration, and/or other interaction(s) with the content. In several implementations, a content agent can prioritize new content when rendering content to a user. For example, a news content agent can prioritize rendering new news content.

In many implementations, additional dialog session(s) can be used to further refine the corpus of content for a content agent. A user can initiate this additional dialog session. For example, a user can initiate the additional dialog session(s) in response to the content agent being used in rendering unwanted content. Additionally or alternatively, new content can be added to the corpus of content (e.g., content not available at the time the content agent was generated), and additional dialog session(s) can be initiated based on this new content. For example, a home robotics kit content agent can be generated using an initial request of "show me projects for my hypothetical home robotics kit" (as well as a corresponding dialog session). New parts can be released for the hypothetical home robotics kit, and corresponding content relating the newly released parts can be identified. In a variety of implementations, the system can proactively initiate a dialog session with the user requesting if this new content (i.e., content relating to the newly released robotics kit parts) should be added to the corpus of content corresponding with the home robotics kit content agent. Similarly, in additional and/or alternative implementations, the user can initiate the dialog session for including and/or excluding the new content in the home robotics kit content agent corpus of content. For example, a user can provide feedback explicitly excluding content by saying "I do not have the newly released robotics kit part".

Content agent(s) can be associated with the user profile of a user making the initial request for content and participating in a dialog session to refine the request for content. A known user profile can be associated with the user based on one or more determined characteristics such as voice signatures (e.g., text independent voice identification, text dependent voice identification, and/or other voice identification), facial recognition, image feeds, motion characteristics, and/or other data. In many implementations, the content agent can be associated with the user profile, thus enabling the content agent to be used in recommending content to the user across many devices of the user. For example, a user can provide the initial request and dialog session to a first client device (e.g., a standalone interactive speaker). The content agent can be associated with the user profile of the user. When the user interacts with a second client device (e.g., a mobile telephone), the content agent associated with the user profile can be utilized in rendering content for the user of the second client device.

A content agent in additional or alternative implementations is correlated with the user creating the content agent while being co-present with one or more additional users. For example, Katherine can make the initial request for content as well as engage in the dialog session to further refine the request for content. The client device can determine/detect Katherine is co-present with Ann (i.e., the additional user) at the time of the request using sensor data. The sensor data may, for example, comprise one or more voice signatures and/or captured images/video. For example, detecting that another user is co-present may include one or more of: detecting multiple voice signatures (e.g., text independent voice identification, text dependent voice identification, and/or other voice identification); detecting the additional user using facial recognition; identifying multiple people in an image feed; identifying motion characteristics of multiple people; and/or other data indicating the co-presence of the additional user. The content agent generated responsive to Katherine's initial request can be correlated with Katherine being co-present with Ann. In some implementations, the content agent can correspond with Katherine being co-present with any additional user (e.g., the content agent is utilized if Katherine is co-present with Sam, Tom, Mary and/or any additional user(s)). In some implementations, the content agent can correspond with Katherine being co-present with the particular additional user (e.g., Katherine must be co-present with Ann for the content agent to be used in rendering additional content for Katherine). In these and other manners, different content agents can be generated for a given user that each have different corresponding content parameter(s) and different co-presence requirements. For example, the given user can have a first music agent with first content parameters and a requirement of the given user being alone (i.e., not co-present with any other users), a second music agent with second content parameters and a requirement of the given user being co-present with one or more particular users (e.g., children of the user), and a third music agent with third content parameters and a requirement of the given user being co-present with one or more additional particular users (e.g., a spouse) but not the one or more particular users (e.g., the children). Accordingly, each content agent can be activated (e.g., utilized to proactively or responsively render content) only responsive to the given co-presence requirements. Such utilization of different content agents for different co-presence situations enables appropriate content to be rendered in appropriate situations, and prevents the wasteful rendering of content that is not sought by the user for the given co-presence situation. In some implementations, different content agents can be utilized for various contextual condition(s), including contextual condition(s) that are in addition to co-presence. For example, an activity a user is engaged in while making the initial request can be considered and associated with a content agent. The activity of the user can be utilized instead of co-presence or along with co-presence. Activities can include, for example, driving a vehicle, riding on public transportation, working out at the gym, watching a movie at home, and/or additional activities. One or more signals from the client device can be utilized in determining the context, such as the current location of the client device, motion of the client device, and/or additional signals. As one example, captured motion signals (e.g., data from an accelerometer of the client device, rapidly changing GPS coordinates, etc.) can indicate a user is driving their car. Co-presence of any additional passengers in the car can be determined. This co-presence while driving a car can be used in activating a content agent. For example, determined co-presence of the user with their family while driving can activate a first content agent, while co-presence of the user with their friend while driving can activate a second content agent. Additionally or alternatively, a user can provide context when making the initial request and/or participating in dialog session(s) to refine the corpus of content. For example, an initial request of "I am watching television with my spouse. Please show me movie recommendations" can be processed to determine contextual conditions of "watching television" (a particular activity) and co-presence of the user with his/her spouse. The contextual conditions can correlated with the content agent and the content agent subsequently activated responsive to determining a re-occurrence of one or more (e.g., all) of the contextual conditions. In a variety of implementations, context at the time of the initial request can automatically be determined based on the request for content and/or based on sensor data from the client device.

Accordingly, various implementations set forth techniques for enabling navigation to user desired content—and do so in a manner that enables navigation to the content to be more efficient through the use of content agents generated using user defined content parameters. For example, a corpus of candidate desired content is identified based on initial content parameters derived from an initial user request for content. Additional content parameters are determined during dialog session(s) with the user, and the initial content parameters as well as the additional content parameters can be used in generating the content agent. These additional content parameters further refine the corpus of content (e.g., refine the corpus of content by removing items of content based on the additional content parameters). Additional dialog sessions (either user initiated dialog(s) and/or content agent initiated dialog(s)) can be used to identify further content parameters, which in turn can be used to update the content agent and further refine the corpus of desired user content. As a content agent (and the corpus of corresponding content) is further refined, the content agent can be used in more efficiently identifying content desired by the user.

System resources (e.g., processor cycles, memory, battery power, and/or additional resources of a computing system) can be conserved by determining user desired content using a content agent. For example, future requests for desired content by the user can be shorter requests by utilizing a generated content agent in rendering the content, and dialog sessions in future requests can be obviated through the persistence of content parameters. Such shorter requests and/or lack of a dialog session can shorten the duration of the overall user-system interaction, conserving various resources through enabling the interaction to cease earlier. Moreover, a content agent can be used to proactively render desired content for a user. This proactive rendering of desired content reduces a user's interactions with a client device (by, for example, eliminating the need for a user to request the desired content), which in turn further reduces the use of system resources.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers and/or one or more robots that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
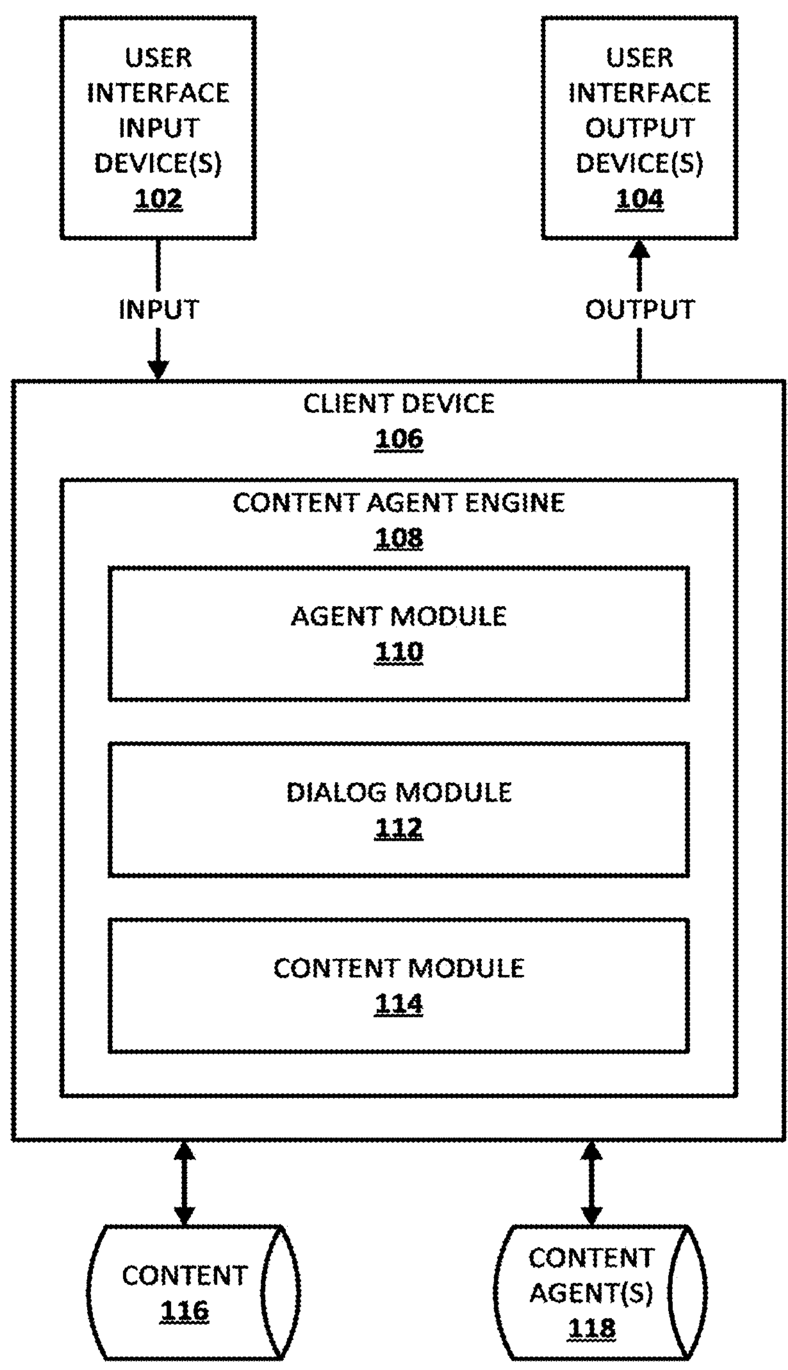
FIG. 1A illustrates an example environment where various implementations disclosed herein can be implemented.

FIG. 1A illustrates an example environment in which implementations disclosed herein may be implemented. The example environment of FIG. 1A includes one or more user interface input devices 102, one or more user interface output devices 104, and client device 106. Additionally or alternatively, client device 106 may be associated with content 116 and/or content agent(s) 118. Client device 106 can include content agent engine 108 for use in generating content agent(s) 118 as well as for use in rendering content from a corpus of content 116 for a user. In many implementations, content agent engine 108 can include a variety of modules including agent module 110, dialog module 112, content module 114 and/or additional modules (not depicted). The user interface input devices 102 may include, for example, a physical keyboard, a touch screen (e.g., implementing a virtual keyboard or other textual input mechanism), a microphone, and/or a camera. The user interface output devices 104 may include, for example, a display screen and/or speaker(s). The user interface input devices 102 and output devices 104 may be incorporated with one or more client device 106 of a user. For example, a mobile phone of the user may include the user interface input and output devices 102, 104; a standalone personal assistant hardware device may include the user interface input and output devices 102, 104; or a first computing device may include the user interface input device(s) 102 and a separate computing device may include the user interface output device(s) 104; etc.

Although client device 106 is illustrated in FIG. 1A as separate from the user interface input and output devices 102, 104, in some implementations, all or aspects of the computing system 106 may be implemented on a client device that also contains the user interface input device(s) 102 and/or the user interface output device(s) 104. In some implementations, client device 106 may include an automated assistant (not depicted), and all or aspects of the automated assistant may be implemented on the computing device(s) that are separate and remote from the computing device that contains the user interface input device(s) 102 and/or the user interface output device(s) 104 (e.g., all or aspects may be implemented "in the cloud"). In some of those implementations, those aspects of the automated assistant may communicate with the computing device via one or more networks such as a local area network (LAN) and/or a wide area network (WAN) (e.g., the internet).

Some non-limiting examples of client device 106 that may include the user interface input device(s) 102 and/or user interface output device(s) 104 include one or more of: a desktop computing device, a laptop computing device, a standalone hardware device at least in part dedicated to an automated assistant, a tablet computing device, a mobile phone computing device, a computing device of a vehicle of the user (e.g., an in-vehicle communications system, an in-vehicle entertainment system, an in-vehicle navigation system), or a wearable apparatus of the user that includes a computing device (e.g., a watch of the user having a computing device, glasses of the user having a computing device, a virtual or augmented reality computing device). Additional and/or alternative computing systems may be provided.

Client device 106 may include one or more memories for storage of data and software applications, one or more processors for accessing data and executing applications, and other components that facilitate communication over a network. The operations performed by client device 106 may be distributed across multiple computing devices. For example, computing programs running on one or more computers in one or more locations can be coupled to each other through a network.

As illustrated in FIG. 1A, a user provides input to client device 106 via the user interface input device(s) 102. The client device provides responsive output for presentation to the user via the user interface output device(s) 104 (optionally after further processing by one or more components). Responsive content can include a variety of digital content including: video, audio, images, web pages, news articles, videos, recipes, blog posts, electronic books, memes, social media posts, and/or additional types of content a user can request for rendering via a client device.

Content agent engine 108 can be utilized by client device 106 to generate content agent(s), use content agent(s) in rendering content for a user, and/or take additional actions using content agent(s). In many implementations, content agent 108 includes a variety of modules including: agent module 110, dialog module 112, content module 114, and/or additional modules (not pictured).

Agent module 110 can be utilized by content agent engine 108 in identifying content parameters in an initial request for content from a user via user interface input device(s) 102; identifying content parameters in a dialog between the user and the client device to refine the corpus of content (e.g., identify content parameters in a dialog initiated by dialog module 112); generating one or more content agents 118; and/or updating an existing content agent 118. For example, a user can provide an initial spoken request for content via user interface input device(s) of "play me a video on my home robotics kit". Agent module 110 can determine one or more content parameters in the initial spoken request (e.g., video, robotics kit). Additionally or alternatively, agent module 110 can determine one or more content parameters in a dialog to refine the request (such as a dialog initiated by dialog module 112). In a variety of implementations, agent module 110 can generate a content agent using initial content parameters as well as additional content parameters determined from the dialog with the user. Furthermore, agent module 110 can update an existing content agent (e.g., update an existing content agent based on further content parameters determined from an additional dialog session).

In a variety of implementations, agent module 110 can be used to determine the user is co-present with an additional user when the user makes the initial request for content. For example, data captured using user interface input device(s) 102 can be utilized in determining the co-presence of the additional user such as: spoken natural language of the additional user captured using a microphone, an image of the additional user captured using a camera, and/or additional captured sensor data indicating the co-presence of the additional user. In a variety of implementations, agent module 110 can associate the co-presence of the additional user with the generated content agent. In other words, a content agent corresponding to the co-presence of the additional user is used in rendering future content when an additional instance of the user being co-present with the user is determined. For example, a content agent can be generated using an initial request from user James where it is determined James is co-present with user Michael. In some implementations, a content agent can be associated with James being co-present with any additional user (e.g., the content agent can be used in rendering content when James is co-present with Mary and/or additional other user(s)). In other implementations, the generated content agent can be associated with James being co-present with Michael (e.g., the content agent can be used in rendering content when James is co-present with Michael and the content agent is not used in rendering content when James is co-present with Mary and/or additional other user(s) other than Michael).

Dialog manager 112 can be utilized in initiating dialog(s) with the user such as a dialog with the user via user interface input device(s) 102 and user interface output device(s) 104. For example, a dialog can include audible output rendered via a speaker as well as spoken responses from the user captured using a microphone. In many implementations, a dialog is initiated subsequent to an initial request for content to refine the request for content when generating a new content agent. For example, a user can provide initial request for content of "show me brunch recipes". An initial corpus of content 116 can be determined (such as by content module 114) responsive to the initial request (e.g., the initial corpus of content 116 is responsive to the request "show me brunch recipes"). Dialog manager 112 can initiate a dialog with the user to refine this request for content, which in turn can refine the corpus of content 116. For example, a dialog following the request "show me brunch recipes" can include: client device "would you like hot or cold brunch items"; user "both"; client device "any food allergies"; user "yes"; client device "what are your food allergies"; user "eggs". In many implementations, this dialog can be provided to agent module 110 to determine additional user parameters (which in many implementations can be utilized by content module 114 to refine corpus of content 116).

Dialog manager 112 can additionally and/or alternatively initiate a dialog to refine the corpus of content at the request of the user. A user can subsequently initiate an additional dialog using dialog module 112 to further refine the corpus of content 116. For example, a user can initiate an additional dialog session in response to the content agent being used in rendering undesirable content. For example, a brunch content agent can be generated using the initial request of "show me brunch recipes" and a corresponding initial dialog session. The brunch content gent can be subsequently used in rendering a banana pancake recipe for the user. A user who does not like bananas can initiate an additional dialog session using dialog module 112 to exclude recipes containing bananas from the corpus of content 116. In a variety of implementations, content parameters can have inherent uncertainty. Dialog module 112 can make a determination whether to initiate a dialog session to remove the uncertainty. For example, a user can initiate a content agent relating to setting up router, where the user has not specified the model. One or more content parameters relating to the specific router can include inherent uncertainty due to the system not knowing the router model. The content agent can initially provide responsive content relating to setting up routers in general. If the user provides a request for content that requires knowledge of the router model (such as a request for setting up a model specific feature), dialog module 112 can initiate a dialog session to prompt the user for the router model.

Additionally or alternatively, dialog module 112 can preemptively initiate a dialog session in response to the addition of new content to the corpus of content 116, in response to signal(s) indicating a user is dissatisfied with rendered content of the corpus of content 116, and/or in response to additional or alternative events. For example, new content can be identified as responsive to the initial content parameter(s) as well as additional content parameter(s) (e.g., identified using content module 114 as described below) for inclusion in the corpus of content 116 associated with the content agent. Dialog manager 112 can preemptively initiate an additional dialog session based on the new content added to the corpus of content 116.

Content module 114 can be utilized to identify an initial corpus of content responsive to initial content parameters (such as content parameters identified using agent module 110), refine a corpus of content based on one or more content parameters (such as additional content parameters determined by agent module 110 from a dialog session, add new content to an existing corpus of content, select an item of content in the corpus of content to render for the user, and/or perform additional action(s) relating to a corpus of content.

In many implementations, content module 114 can identify an initial corpus of content responsive to a request for content from a user. For example, content module 114 can identify content 1, content 2, content 3, content 4, content 5, content 6, content 7, and content 8 as responsive to initial content parameters corresponding to the initial request for content via the user (e.g., initial content parameters as determined by agent module 110 described above). Additionally or alternatively, content module 114 can refine the initial corpus of content based on content parameter(s) such as content parameters determined by agent module 110 from a dialog imitated by dialog module 112. For example, content agent 114 can use content parameters determined from a dialog with the user to refine the corpus of content by removing, for example, content 2, content 4, and content 5 (i.e., the corpus of content is reduced from 8 items of content to 5 items of content (content 1, content 3, content 5, content 7, and content 8) based on additional content parameters). Reduction of the corpus of content can include additional or alternatively reductions, such as reducing the corpus of content by 10%, 25%, 50%, and/or additional reductions in the number of items in the corpus of content based on the further content parameters.

Content module 114 can be utilized to add new content to an existing corpus of content. For example, new content can be added if the number of items in the corpus of content drops below a threshold value, if new content not previously included in the corpus of content is identified, if new content is identified where the new content was created after determining the initial corpus of content is identified (e.g., a news article published today which is responsive to content parameter(s) can be added to a corpus of content determined to be responsive to content parameter(s) last week), and/or if additional new content is identified.

Additionally or alternatively, content module 114 can select an item of content to render for user. For example, a user can request an additional item of content, and content module 114 can select the item of content to render. Additionally or alternatively, content module 114 can preemptively render an item of content to a user. For example, content module 114 can select an item of content to render for the user when the user is determined to be co-present with the additional user. In many implementations, content can be differentiated between content a user is likely to want to revisit (i.e., revisitable content) and/or content a user is unlikely to want to revisit (i.e., unrevisitable content). For example, a user is likely to want to revisit a song by their favorite band (i.e., the music is revisitable content). When selecting an item of content 116 the user has interacted with before, content module 114 can vary the order of the previously interacted with content. For example, content module 114 can select music content in order A, B, C, D, E the first time the content is rendered for the user, and content module 114 can select music content in the order B, D, E, C, A the second time the content is rendered for the user. Additionally or alternatively, a user is less likely to want to revisit a news article they have already read (i.e., the news articles is unrevisitable content). Content module 114 can exclude this previously rendered content from the corpus of content. In many implementations, content module 114 can prioritize new content when selecting content to render for the user. For example, content module 114 can prioritize a newly released song by a user's favorite band when selecting an item of content.

Figure 1B:
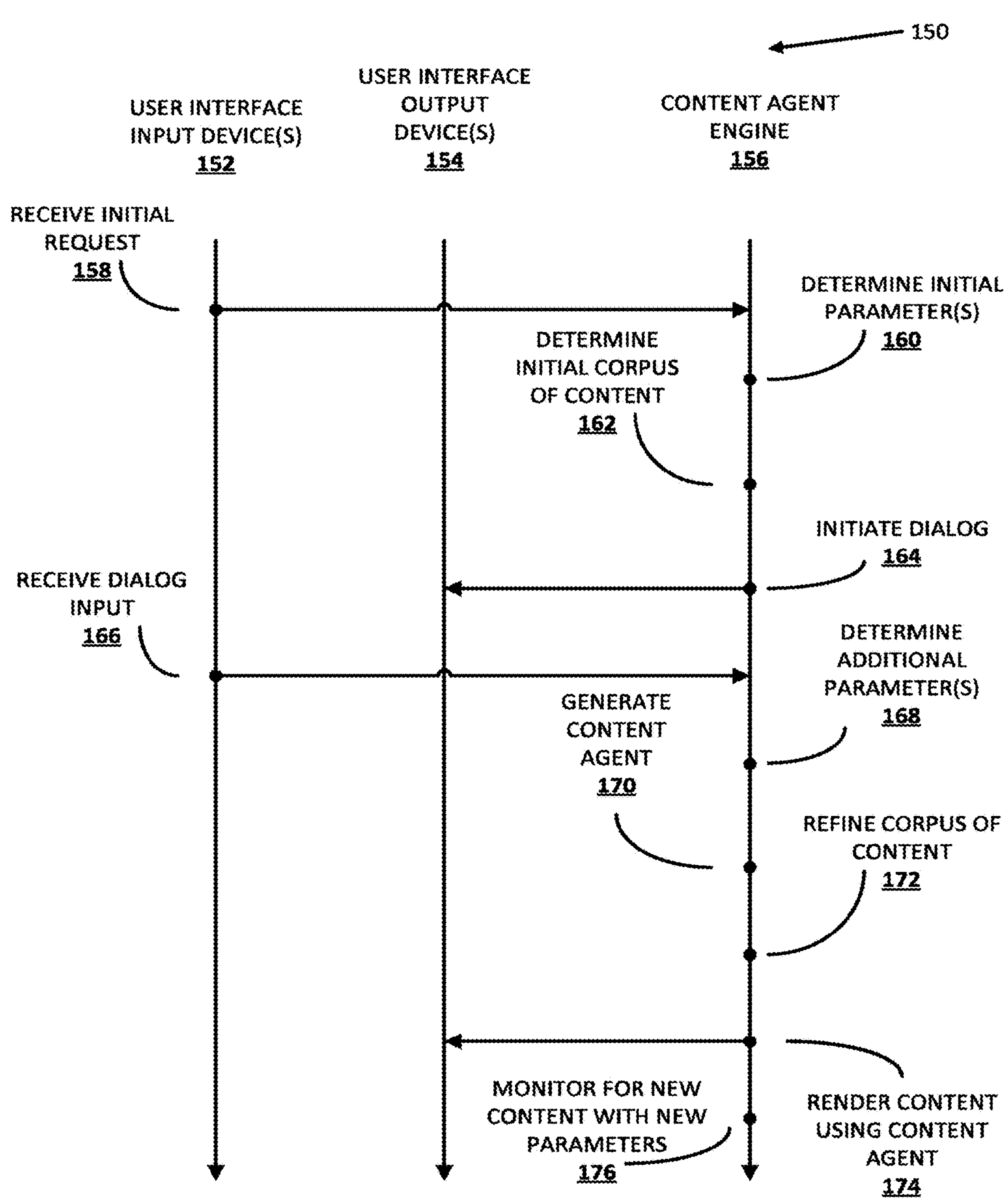
FIG. 1B illustrates an example state diagram in accordance with various implementations described herein.

FIG. 1B illustrates an example state diagram 150 in accordance with various implementations. In FIG. 1B, an initial request for content 158 is captured using one or more user interface input devices 152 (e.g., user interface input device(s) 102 of FIG. 1A) and transmitted to content agent engine 156 (e.g., content agent engine 108 of FIG. 1A) of the client device (e.g., client device 106 of FIG. 1A). For example, a user can provide a spoken request of "show me how to use my hypothetical home robotics kit" which is captured by a microphone. Additionally or alternatively, a user can type the initial request of "show me how to use my hypothetical home robotics kit" using a touch screen of the client device.

At 160, content agent engine 156 determines initial content parameter(s) based on the received initial request. For example, initial content parameters of "hypothetical home robotics kit", "how to use", and/or additional content parameters can be determined from the initial request of "show me how to use my hypothetical home robotics kit".

At 162, content agent engine 156 can determine an initial corpus of content. In many implementations, the initial corpus of content includes content responsive to the initial content parameter(s). For example, the initial corpus of content can include image(s), video(s), article(s), and/or other items of content relating to the hypothetical home robotics kit. At 164, the content agent engine 156 can initiate a dialog session by transmitting dialog to be rendered via user interface output device(s) 154. At 166, the user can provide input to user interface input device(s) 154 in response to the dialog session rendered via user interface output device(s) 154. In many implementations, the received dialog input can be transmitted to content agent engine 156. In a variety of implementations, the dialog session can include multiple turns in the conversation. For example, a dialog session for an initial request for content of "show me how to use my hypothetical home robotics kit" can include: client device "what version do you have?"; user "version number 1.0"; client device "would you like to include videos?"; user "yes".

In many implementations, content agent engine 156 can optionally determine the user providing the initial request for content 158 is co-present with an additional user while making the initial request and/or while participating in the dialog session to further refine the request for content.

At 168, content agent 156 can determine additional content parameter(s) from the dialog session. For example, additional content parameters of "version number 1.0", "include video", and/or additional content parameters can be determined from the dialog session initiated at 164.

At 170, content agent engine 156 can generate a content agent using initial content parameters determined at 160 and additional content parameters determined at 168. In many implementations, the generated content agent can be optionally be correlated with the user being co-present with the additional user.

At 172, content agent engine 156 can refine the corpus of content using additional content parameter(s) determined at 168. For example, the additional content parameter of "version number 1.0" can be used to refine the corpus of content to exclude content related to version number 2.0.

At 174, content agent engine 156 can utilize the generated content agent in rendering content by selecting an item of content from the refined corpus of content and transmitting the content to one or more user interface output devices 154 for rendering.

At 176, content agent 156 can monitor for new content to include in the corpus of content responsive to the initial content parameter(s) and the additional content parameter(s). In many implementations, the new content can be associated with content parameter(s) not included in the initial content parameter(s) and/or the additional content parameter(s). This identification can of new content and/or corresponding new content parameter(s) can cause content agent 156 to initiate an additional dialog session with the user at 164, and proceed to 166, 168, 170, 172, and/or 174. In many implementations, new content parameter(s) are determined from the additional dialog, and these new content parameter(s) can be used to further refine the corpus of content. For example, content agent engine 156 can determine new content relating to hypothetical home robotics kit version number 3.0. A dialog session regarding the new version, version number 3.0, can be initiated at 164, and the resulting dialog session can be used to identify additional content parameter(s) to further refine the corpus of content.

Figure 2:
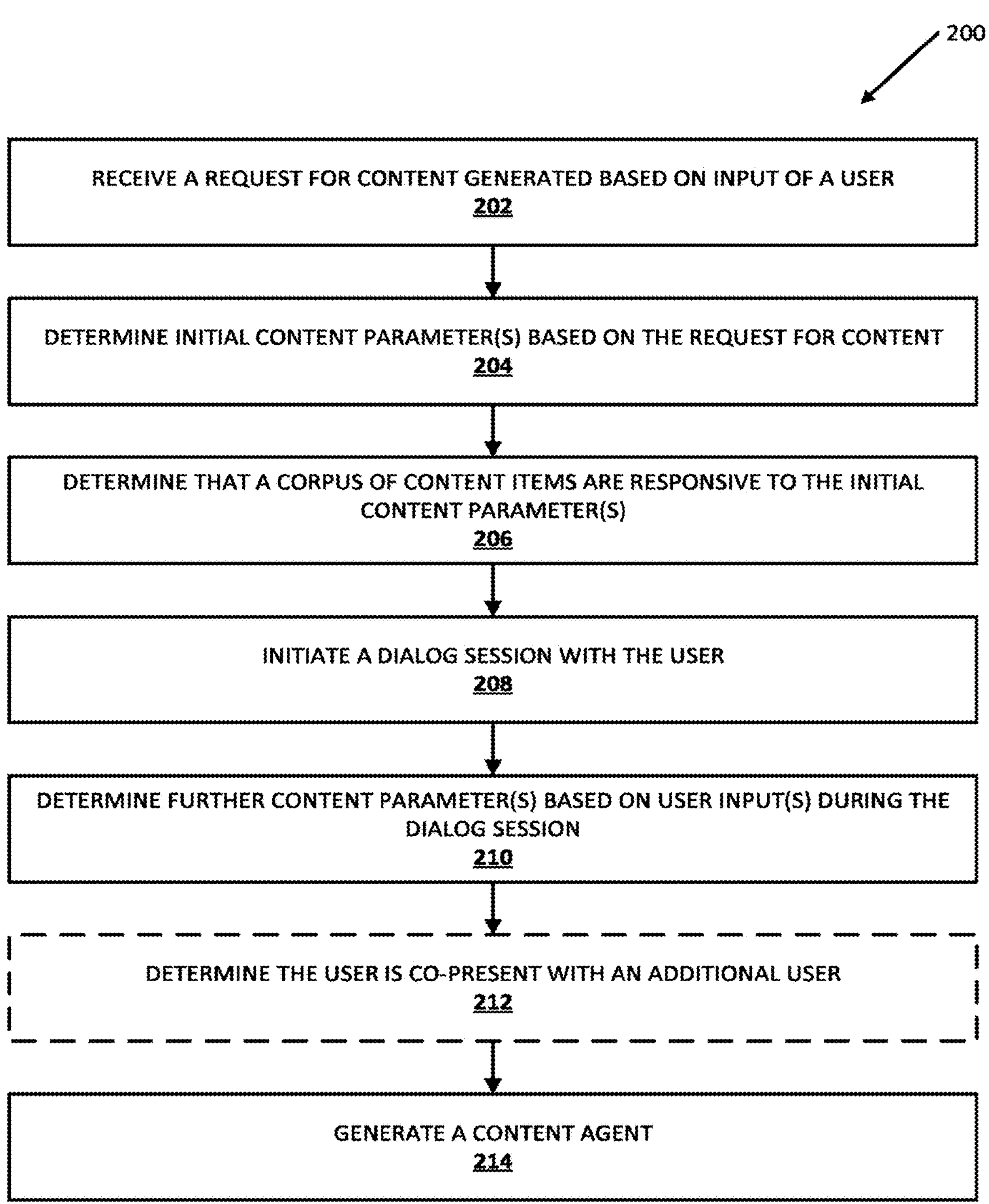
FIG. 2 is a flowchart illustrating an example process of generating a content agent in accordance with various implementations described herein.

FIG. 2 is a flowchart illustrating an example process 200 of generating a content agent according to implementations disclosed herein. For convenience, the operations of the flowchart are described with reference to a system that performs the operations. This system may include various components of various computer systems, such as one or more components of client device 106 of FIG. 1A. Moreover, while operations of process 200 are shown in a particular order, this is not meant to be limiting. One or more operations may be reordered, omitted, and/or added.

At block 202, the system receives a request for content, where the request is generated based on input of a user. For example, a user can provide a variety of types of requests including a spoken request for content of "show me dinner restaurants". The request for content can include a spoken request, a typed request, a request initiated by pushing a button (a physical button and/or selecting a virtual button on a user interface), a gesture request, and/or additional types of user requests. A user can request a variety of types of content including video, audio, images, web pages, news articles, videos, recipes, blog posts, electronic books, memes, social media posts, and/or additional types of content a user can request for rendering via a client device. In a variety of implementations, a request for content can identify a specific type of content (e.g., "play me a news video" specifies to render video(s)). Additionally or alternatively, a request for content does not have to specify a type of content, and a variety of types of content can be determined responsive to the request (e.g. a variety of types of content can be responsive to the request of "show me the news" including videos, articles, web pages, and/or additional types of content).

Furthermore, type(s) of content can be determined as content parameter(s) during dialog session(s) with the user. For example, the dialog session can include: client device "would you like to see videos"; user "no"; client device "would you like to see news articles"; user "yes", which can exclude one type of content (videos) while including another type of content (news articles). In some implementations, the types of allowable content are only types of content specified by content parameters. In other implementations, all types of content are allowable expect for types specifically excluded in content parameters.

At block 204, the system determines initial content parameter(s) based on the request for content. For example, initial content parameters of "Hypothetical Sports Team" and "news" can be determined from an initial request for content of "show me news about Hypothetical Sports Team".

At block 206, the system determines that a corpus of content items are responsive to the initial content parameter(s). For example, a corpus of content can be determined which includes news articles relating to Hypothetical Sports Team, videos relating to Hypothetical Sports Team, and/or additional content relating to Hypothetical Sports Team.

At block 208, the system initiates a dialog session with the user. For example, the dialog session can include audio content rendered via a speaker of the client device as well as spoken input captured by a microphone of the client device. Additional and/or alternatively dialog sessions can include the use of a variety of user interface input and output devices. For example, as described above with respect to block 202, a dialog session can include: client device "would you like to see videos"; user "no"; client device "would you like to see news articles"; user "yes".

At block 210, the system determines further content parameter(s) based on user input(s) during the dialog session. For example, further content parameters of no videos, include news articles can be determined from the dialog session of: client device "would you like to see videos"; user "no"; client device "would you like to see news articles"; user "yes".

At block 212, the system optionally determines whether the user is co-present with an additional user. For example, the system can determine the co-presence of the additional user based on data captured using user interface input device(s) such as: spoken natural language of the additional user captured using a microphone, an image of the additional user captured using a camera, and/or additional captured sensor data indicating the co-presence of the additional user.

At block 214, the system generates a content agent based on the initial parameter(s) (i.e., the content parameter(s) determined from the initial request for content) as well as the further content parameter(s) (i.e., the content parameter(s) determined from the dialog session with the user). In many implementations, if the system determines the user is co-present with an additional user at block 212, the system can correlate the content agent with the user being co-present with the additional user. In some such implementations, the content agent can be correlated with the user being co-present with any additional user. In other implementations, the content agent can be correlated with the user being co-present with the specific additional user determined to be co-present with the user in block 212.

Figure 3:
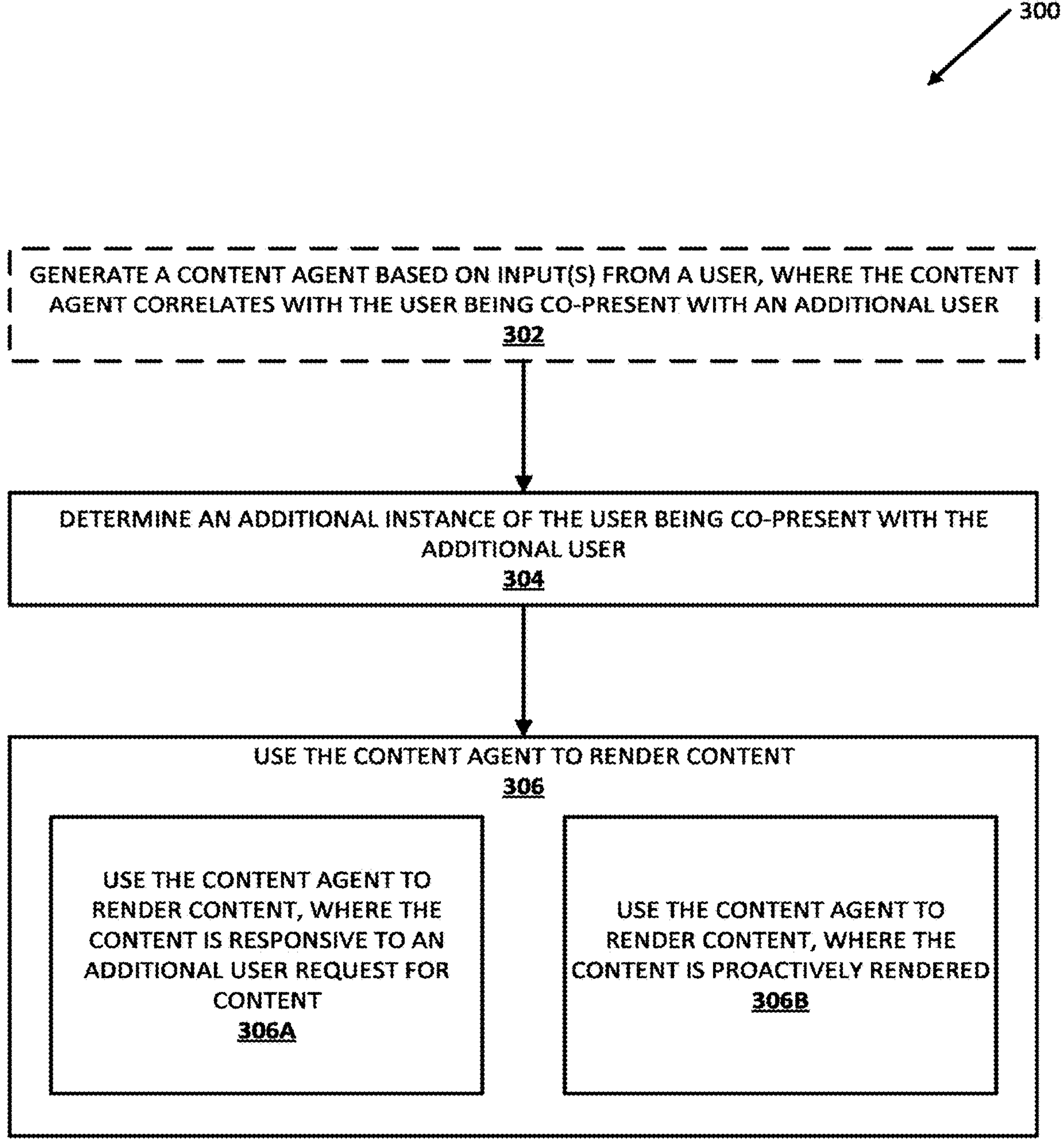
FIG. 3 is a flowchart illustrating an example process of determining content using a content agent in accordance with various implementations described herein.

FIG. 3 is a flowchart illustrating an example process 300 of determining additional content using the content agent according to implementations disclosed herein. For convenience, the operations of the flowchart are described with reference to a system that performs the operations. This system may include various components of various computer systems, such as one or more components of client device 106 of FIG. 1A. Moreover, while operations of process 300 are shown in a particular order, this is not meant to be limiting. One or more operations may be reordered, omitted, and/or added.

At block 302, the system optionally generates a content agent based on input(s) from a user. For example, a content agent can be generated in accordance with process 200 of FIG. 2. In many implementations, the generated content agent can be correlated with the user being co-present with an additional user. For example, the co-presence of the user with the additional user can be determined in accordance with block 212 of process 200.

At block 304, the system determines an additional instance of the user being co-present with the additional user. For example, the system can determine the additional instance of co-presence of the additional user based on data captured using user interface input device(s) such as: spoken natural language of the additional user captured using a microphone, an image of the additional user captured using a camera, and/or additional captured sensor data indicating the co-presence of the additional user.

At block 306, the system uses the content agent to render content for the user via one or more user interface output devices. Content agents in accordance with implementations described herein can be utilized to render content in a variety of ways as illustrated in blocks 306A and 306B.

At block 306A, the system uses the content agent to render content, where the content is responsive to an additional user request for content. For example, a recipe content agent can be generated using an initial request of "show me dinner recipes". The recipe content agent can be used in rendering content for a subsequent request by the user of "show me lunch recipes".

At block 306B, the system uses the content agent to render content, where the content is proactively rendered. For example, the system can determine an additional instance of the user being co-present with the additional user, and can proactively render a brunch recipe using the recipe content agent.

Figure 4:
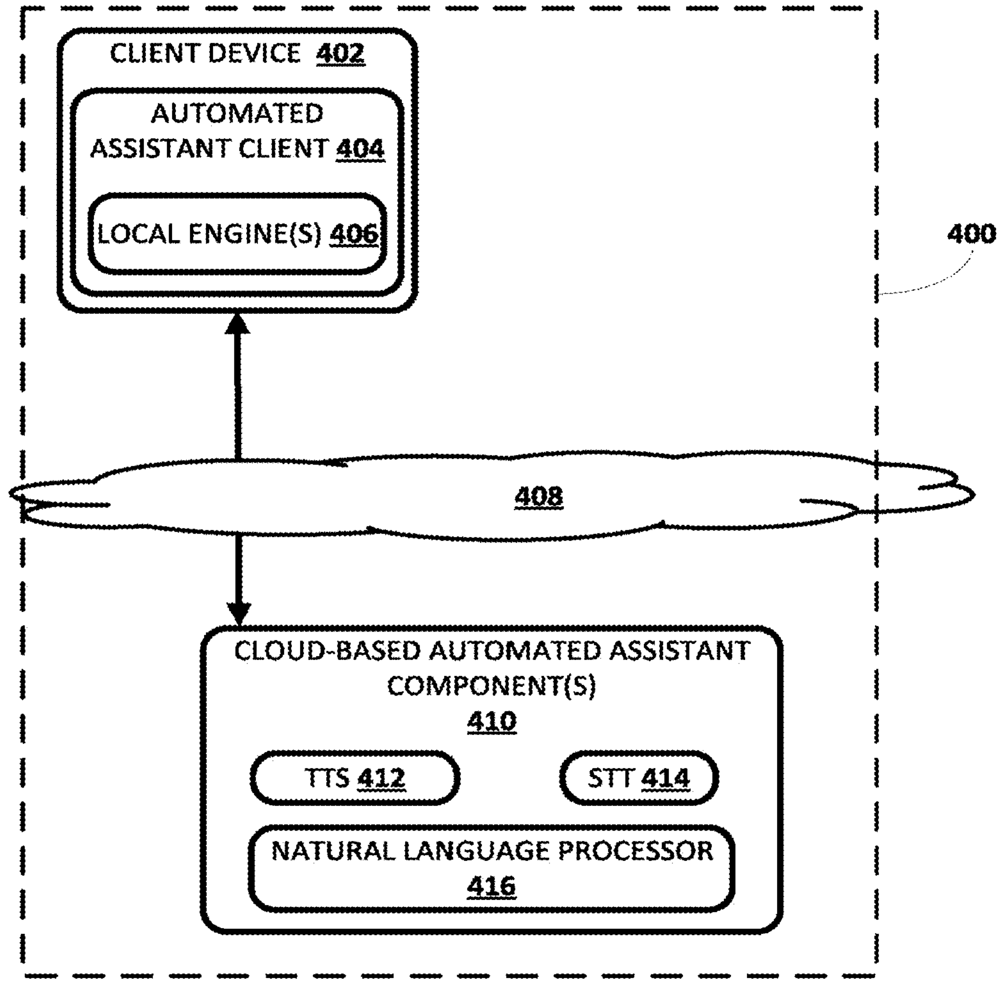
FIG. 4 illustrates another example environment in which implementations disclosed herein can be implemented.

Turning to FIG. 4, an example environment in which implementations disclosed herein can be implemented. FIG. 4 includes a client computing device 402, which execute an instance of an automated assistant client 404. One or more cloud-based automated assistant components 410 can be implemented on one or more computing systems (collectively referred to as a "cloud" computing system) that are communicatively coupled to client device 402 via one or more local and/or wide area networks (e.g., the Internet) indicated generally at 408.

An instance of an automated assistant client 404, by way of its interactions with one or more cloud-based automated assistant components 410, may form what appears to be, from the user's perspective, a logical instance of an automated assistant 400 with which the user may engage in a human-to-computer dialog. It thus should be understood that in some implementations, a user that engages with an automated assistant client 404 executing on client device 402 may, in effect, engage with his or her own logical instance of an automated assistant 400. For the sakes of brevity and simplicity, the term "automated assistant" as used herein as "serving" a particular user will often refer to the combination of an automated assistant client 404 executing on a client device 402 operated by the user and one or more cloud-based automated assistant components 410 (which may be shared amongst multiple automated assistant clients of multiple client computing devices). It should also be understood that in some implementations, automated assistant 400 may respond to a request from any user regardless of whether the user is actually "served" by that particular instance of automated assistant 400.

The client computing device 402 may be, for example: a desktop computing device, a laptop computing device, a tablet computing device, a mobile smartphone computing device, a standalone interactive speaker, a smart appliance, and/or a wearable apparatus of the user that includes a computing device (e.g., a watch of the user having a computing device, glasses of the user having a computing device, a virtual or augmented reality computing device). Additional and/or alternative client computing devices may be provided. Additionally or alternatively, operations of client computing device 402 may be distributed between multiple computing devices. For example, one or more operations of client computing device 402 may be distributed between a mobile smartphone and a vehicle computing device. Furthermore, operations of client computing device 402 may be repeated between multiple computing devices (which in some cases may be communicatively coupled). As a further example, a mobile smartphone as well as a vehicle interface device may each implement operations of automated assistant 400, such as a mobile smartphone and a vehicle interface device both including an invocation engine (described below). In various implementations, the client computing device 402 may optionally operate one or more other applications that are in additional to automated assistant client 404, such as a message exchange client (e.g., SMS, MMS, online chat), a browser, and so forth. In some of those various implementations, one or more of the other applications can optionally interface (e.g. via an application programming interface) with the automated assistant 404, or include their own instance of an automated assistant application (that may also interface with the cloud-based automated assistant component(s) 410).

Automated assistant 400 engages in human-to-computer dialog sessions with a user via user interface input and output devices of the client device (not pictured). To preserve user privacy and/or to conserve resources, in many situations a user must often explicitly invoke the automated assistant 400 before the automated assistant will fully process a spoken utterance. The explicit invocation of the automated assistant 400 can occur in response to certain user interface input received at the client device 402. For example, user interface inputs that can invoke the automated assistant 400 via the client device 402 can optionally include actuations of a hardware and/or virtual button of the client device 402. Moreover, the automated assistant client can include one or more local engines 406, such as an invocation engine that is operable to detect the presence of one or more spoken invocation phrases. The invocation engine can invoke the automated assistant 400 in response to detection of one or more of the spoken invocation phrases. For example, the invocation engine can invoke the automated assistant 400 in response to detecting a spoken invocation phrase such as "Hey Assistant", "OK Assistant", and/or "Assistant". The invocation engine can continuously process (e.g., if not in an "inactive" mode) a stream of audio data frames that are based on output from one or more microphones of the client device 402, to monitor for an occurrence of a spoken invocation phrase. While monitoring for the occurrence of the spoken invocation phrase, the invocation engine discards (e.g., after temporary storage in a buffer) any audio data frames that do not include the spoken invocation phrase. However, when the invocation engine detects an occurrence of a spoken invocation phrase in processed audio data frames, the invocation engine can invoke the automated assistant 400. As used herein, "invoking" the automated assistant 400 can include causing one or more previously inactive functions of the automated assistant 400 to be activated. For example, invoking the automated assistant 400 can include causing one or more local engines 406 and/or cloud-based automated assistant components 410 to further process audio data frames based on which the invocation phrase was detected, and/or one or more following audio data frames (whereas prior to invoking no further processing of audio data frames was occurring).

The one or more local engine(s) 406 of automated assistant 404 are optional, and can include, for example, the invocation engine described above, a local speech-to-text ("STT") engine (that converts captured audio to text), a local text-to-speech ("TTS") engine (that converts text to speech), a local natural language processor (that determines semantic meaning of audio and/or text converted from audio), and/or other local components. Because the client device 402 is relatively constrained in terms of computing resources (e.g., processor cycles, memory, battery, etc.), the local engines 406 may have limited functionality relative to any counterparts that are included in cloud-based automated assistant components 410.

Automated assistant client 404 can additionally include a content agent engine (not pictured) which can be utilized by automated assistant client 404 in accordance with a variety of implementations including: generating a content agent, determining content related to a user request using a content agent, determining content using a content agent without receiving a user request, etc.

Cloud-based automated assistant components 410 leverage the virtually limitless resources of the cloud to perform more robust and/or more accurate processing of audio data, and/or other user interface input, relative to any counterparts of the local engine(s) 406. Again, in various implementations, the client device 402 can provide audio data and/or other data to the cloud-based automated assistant components 410 in response to the invocation engine detecting a spoken invocation phrase, or detecting some other explicit invocation of the automated assistant 400.

The illustrated cloud-based automated assistant components 410 include a cloud-based TTS module 412, a cloud-based STT module 414, and a natural language processor 416. In some implementations, one or more of the engines and/or modules of automated assistant 400 may be omitted, combined, and/or implemented in a component that is separate from automated assistant 400. Further, in some implementations automated assistant 400 can include additional and/or alternative engines and/or modules.

Cloud-based STT module 414 can convert audio data into text, which may then be provided to natural language processor 416. In various implementations, the cloud-based STT module 414 can convert audio data into text based at least in part on indications of speaker labels and assignments that are provided by an assignment engine (not illustrated).

Cloud-based TTS module 412 can convert textual data (e.g., natural language responses formulated by automated assistant 400) into computer-generated speech output. In some implementations, TTS module 412 may provide the computer-generated speech output to client device 402 to be output directly, e.g., using one or more speakers. In other implementations, textual data (e.g., natural language responses) generated by automated assistant 400 may be provided to one of the local engine(s) 406, which may then convert the textual data into computer-generated speech that is output locally.

Natural language processor 416 of automated assistant 400 processes free form natural language input and generates, based on the natural language input, annotated output for use by one or more other components of the automated assistant 400. For example, the natural language processor 416 can process natural language free-form input that is textual input that is a conversion, by STT module 414, of audio data provided by a user via client device 402. The generated annotated output may include one or more annotations of the natural language input and optionally one or more (e.g., all) of the terms of the natural language input. In some implementations, the natural language processor 416 is configured to identify and annotate various types of grammatical information in natural language input. For example, the natural language processor 416 may include a part of speech tagger (not depicted) configured to annotate terms with their grammatical roles. Also, for example, in some implementations the natural language processor 416 may additionally and/or alternatively include a dependency parser (not depicted) configured to determine syntactic relationships between terms in natural language input.

In some implementations, the natural language processor 416 may additionally and/or alternatively include an entity tagger (not depicted) configured to annotate entity references in one or more segments such as references to people (including, for instance, literary characters, celebrities, public figures, etc.), organizations, locations (real and imaginary), and so forth. The entity tagger of the natural language processor 416 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the natural language processor 416 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there."

In some implementations, one or more components of the natural language processor 416 may rely on annotations from one or more other components of the natural language processor 416. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the natural language processor 416 may use related prior input and/or other related data outside of the particular natural language input to determine one or more annotations.

Figure 5:
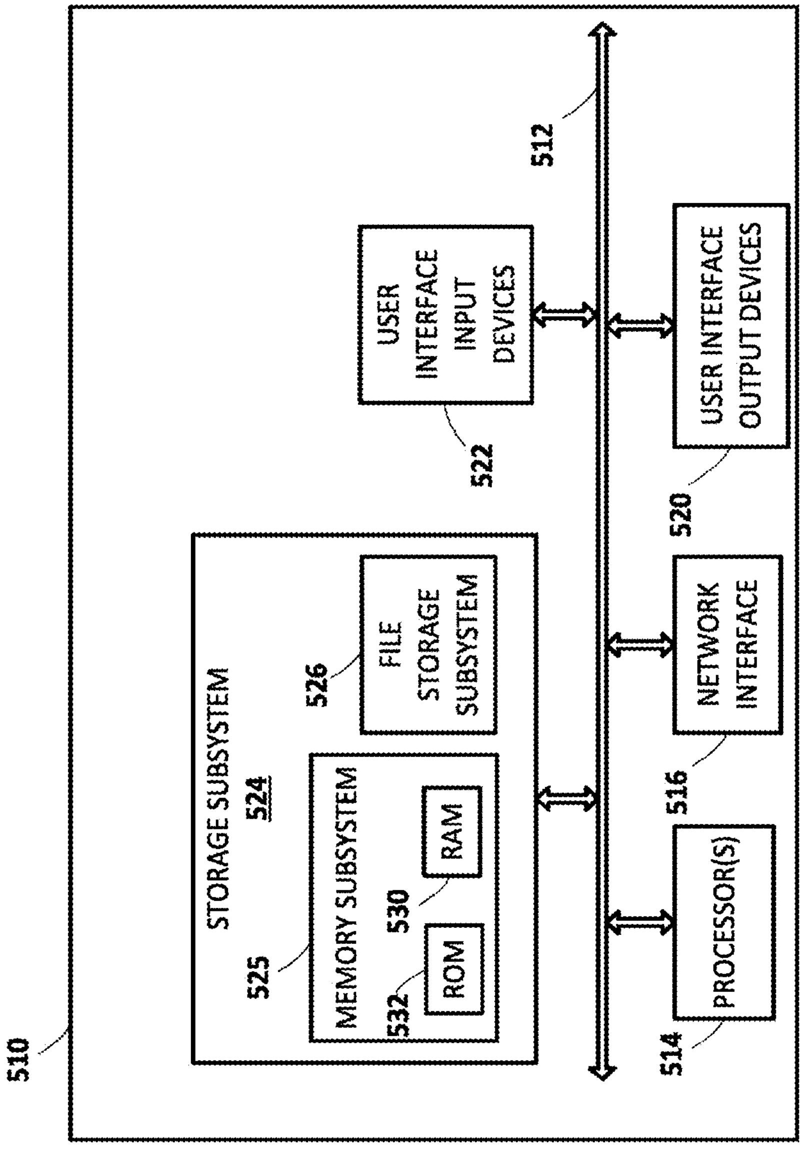
FIG. 5 illustrates an example architecture of a computing device.

FIG. 5 is a block diagram of an example computing device 510 that may optionally be utilized to perform one or more aspects of techniques described herein. In some implementations, one or more of a client computing device, and/or other component(s) may comprise one or more components of the example computing device 510.

Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube ("CRT"), a flat-panel device such as a liquid crystal display ("LCD"), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of one or more of the processes of FIG. 2, and/or FIG. 3, as well as to implement various components depicted in FIG. 1A.

These software modules are generally executed by processor 514 alone or in combination with other processors. Memory 525 used in the storage subsystem 524 can include a number of memories including a main random access memory ("RAM") 530 for storage of instructions and data during program execution and a read only memory ("ROM") 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the methods described herein. Some implementations also include one or more non-transitory computer readable storage media storing computer instructions executable by one or more processors to perform any of the methods described herein.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided and includes receiving a request for content. The request for content generated based on input of a user via one or more user interface input devices of a client device. The method further includes determining one or more initial content parameters based on the user request. The method further includes determining that a corpus of content items are responsive to the initial content parameters. In response to determining that the corpus of content items are responsive to the initial content parameters, the method further includes initiating a dialog session with the user via the client device, determining one or more further content parameters based on one or more user inputs during the dialog session, the further content parameters refining the request and restricting a quantity of the content items of the corpus that are responsive to the request. The method further includes determining that, at the time of the request, the user is co-present with at least one additional user. The method further includes generating a content agent based on the initial content parameters associated with the request and the further content parameters determined based on the user inputs during the dialog session. The method further includes correlating the content agent with the user being co-present with the additional user. Subsequent to generating the content agent, the method further includes determining an additional instance of the user being co-present with the additional user. In response to the content agent being correlated with the user being co-present with the additional user, the method further includes using the content agent to proactively render given content that conforms to the initial content parameters and to the further content parameters.

These and other implementations of the technology disclosed herein can include one or more of the following features.

In some implementations, initiating the dialog session with the user via the client device, and determining the one or more further content parameters based on the one or more user inputs during the dialog session is further includes determining that the corpus of content items exceeds a threshold number of content items.

In some implementations, initiating the dialog session with the user via the client device, and determining the one or more further content parameters based on the one or more user inputs during the dialog session is further in response to: determining that a quantity of the content items in the corpus of content items exceeds a threshold quantity.

In some implementations, initiating the dialog session with the user via the client device includes: generating, based on one or more features of one or more of the content items in the corpus of content items, a prompt that is tailored to the one or more of the content items. In some versions of those implementations, the method further includes rendering the prompt responsive to the user request, and prior to the one or more user inputs during the dialog session.

In some implementations, subsequent to generating the content agent, the method further includes determining one or more new items of content responsive to the initial content parameters to include in the corpus of content items, wherein the new items of content are created subsequent to determining the corpus of content items. In some versions of those implementations, the method further includes generating, based on one or more new features of one or more of the new items of content, a new prompt that is tailored to the one or more of the new items of content. In some versions of those implementations, the method further includes initiating a subsequent dialog session with the user via the client device by providing the new prompt. In some versions of those implementations, the method further includes determining one or more subsequent content parameters based on one or more subsequent user inputs during the subsequent dialog session, the subsequent content parameters further refining the request and restricting a quantity of the new items of content of the corpus that are responsive to the request. In some versions of those implementations, the method further includes modifying the content agent based on the subsequent content parameters.

In some implementations, subsequent to generating the content agent and prior to proactively rendering the given content that conforms to the initial content parameters and to the further content, the method further includes: determining content that is responsive to the user request using the content agent. In some versions of those implementations, the method further includes causing the computing system to render the content responsive to the user request.

In some implementations, subsequent to using the content agent to proactively render the given content that conforms to the initial content parameters and to the further content parameters, the method further includes: determining one or more additional content parameters by initiating an additional dialog session with the user via the client device, the additional content parameters further refining the request and further restricting the content items of the corpus that are responsive to the request.

In some implementations, the corpus of content items includes content items of at least two media types.

In some implementations, the corpus of content items includes content items unviewed by the user, and wherein using the content agent to proactively render the given content comprises prioritizing the content items unviewed by the user in selecting the given content from the corpus of content items.

In some implementations, subsequent to using the content agent to proactively render the given content that conforms to the initial content parameters and to the further content parameters, the method further includes: receiving one or more user feedback signals indicating whether or not the user interacted with the given content. In some versions of those implementations, the method further includes updating the content agent based on the one or more user feedback signals.

In some implementations, the one or more user feedback signals includes a positive feedback signal indicating the user interacted with the content. In some versions of those implementations, the one or more user feedback signals includes a negative feedback signal indicating the user did not interact with the content.

In some implementations, the client device includes an automated assistant client, wherein the request is received at an assistant interface of the automated assistant client, and wherein the dialog session is a dialog session with the user and the automated assistant client of the client device. In some versions of those implementations, the user is associated with a user profile of the automated assistant client, and the method further includes: determining a further instance of the user being co-present with the additional user using an additional client device, wherein the additional client device is distinct from the client device, and wherein the further instance of the user being co-present with the additional user is subsequent to the additional instance of the user being co-present with the additional user. In some versions of those implementations, the method further includes using the content agent to proactively render additional given content using the additional client device. In some versions of those implementations, the additional user is associated with a known user profile of the client device, and wherein determining the additional instance of the user being co-present with the additional user includes: determining the additional instance of the user being co-present with the additional user associated with the known user profile of the client device. In some versions of those implementations, the additional user is not associated with a known user profile of the client device.

In some implementations, the method further includes determining, at the time of the request, an additional context of the request. In some implementations, correlating the content agent with the user being co-present with the additional user further includes correlating the content agent with the user being co-present with the additional user in the additional context of the request. The additional context can be, for example, an activity in which the user is engaged. The activity can be determined based on explicit input from the user (e.g., "I'm doing weekend chores") and/or can be determined based on various sensor signals (e.g., GPS, accelerometer, etc.). In some implementations, the additional context is determined automatically and is determined based at least in part on sensor data from one or more sensors of the client device.

In some implementations, a method implemented by one or more processors is provided that includes receiving a request for content, the request for content generated based on input of a user via one or more user interface input devices of a client device. The method further includes determining one or more initial content parameters based on the user request. The method further includes determining that a corpus of content items are responsive to the initial content parameters. In response to determining that the corpus of content items are responsive to the initial content parameters, the method further includes initiating a dialog session with the user via the client device, and determining one or more further content parameter based on one or more user inputs during the dialog session, the further content parameters refining the request and restricting a quantity of the content items of the corpus that are responsive to the request. The method further includes determining that, at the time of the request, the user is co-present with at least one additional user. The method further includes generating a content agent based on the initial content parameters associated with the request and the further content parameters determined based on the user inputs during the dialog session. The method further includes correlating the content agent with the user being co-present with the additional user. Subsequent to generating the content agent, the method further includes receiving an additional request for content, the additional request for content generated based on additional input of the user via the one or more user interface input devices of the client device. The method further includes determining an additional instance of the user being co-present with the additional user. In response to the content agent being correlated with the user being co-present with the additional user, the method further includes using the content agent to determine additional content responsive to the additional user request. The method further includes causing the client device to render the additional content.

In some implementations, a method implemented by one or more processors is provided that includes receiving a request for content, the request for content generated based on input of a user via one or more user interface input devices of a client device. The method further includes determining one or more initial content parameters based on the request. The method further includes determining that a corpus of content items are responsive to the initial content parameters. In response to determining that the corpus of content items are responsive to the initial content parameters, the method further includes initiating a dialog session with the user via the client device. The method further includes determining one or more further content parameter based on one or more user inputs during the dialog session, the further content parameters refining the request and restricting a quantity of the content items of the corpus that are responsive to the request. The method further includes automatically determining, based on the request for content and/or based on sensor data from the client device, one or more contextual conditions at the time of the request. The method further includes generating a content agent based on the initial content parameters associated with the request and the further content parameters determined based on the user inputs during the dialog session. The method further includes correlating the content agent with the one or more contextual conditions. Subsequent to generating the content agent, the method further includes determining an additional instance of occurrence of the one or more contextual conditions. In response to the content agent being correlated with the one or more contextual conditions, the method further includes using the content agent to proactively render given content that conforms to the initial content parameters and to the further content parameters.

These and other implementations of the technology disclosed herein can include one or more of the following features.

In some implementations, the one or more contextual conditions include the user being engaged in a particular activity at the time of the request. In some versions of those implementations, the one or more contextual conditions include co-presence, of the user with at least one additional user, at the time of the request.

What is claimed is:

1. A method implemented by one or more processors, the method comprising:

receiving a request for content, the request for content generated based on input of a user via one or more user interface input devices of a client device;

determining one or more initial content parameters based on the request;

determining that a corpus of content items are responsive to the initial content parameters;

in response to determining that the corpus of content items are responsive to the initial content parameters:

initiating a dialog session with the user via the client device, and determining one or more further content parameters based on one or more user inputs during the dialog session, the further content parameters refining the request and restricting the quantity of the content items of the corpus that are responsive to the request;

automatically determining, based on the request for content and/or based on sensor data from the client device, one or more contextual conditions present at the time of the request;

generating a content agent based on the initial content parameters associated with the request and the further content parameters determined based on the user inputs during the dialog session;

correlating the content agent with the one or more contextual conditions; and subsequent to generating the content agent:

determining an additional request for content, the additional request for content generated based on additional input of the user;

determining an additional instance of occurrence, at the time of the additional request, of the one or more contextual conditions;

in response to the additional request for content and based on the content agent being correlated with the one or more contextual conditions:

using the content agent to render given content that conforms to the initial content parameters and to the further content parameters.

2. The method of claim 1, wherein the one or more contextual conditions include the user being engaged in a particular activity at the time of the request.

3. The method of claim 2, wherein generating the content agent based on the initial content parameters associated with the request and the further content parameters determined based on the user inputs during the dialog session comprises:

generating, based on the one or more contextual conditions and one or more features of the one or more of the content items in the corpus of content items, a prompt that is tailored to the one or more contextual conditions and the one or more features of the one or more content items in the corpus of content items.

4. The method of claim 3, wherein the additional input of the user includes the prompt that is tailored to the one or more contextual conditions and the one or more features of the one or more content items in the corpus of content items.

5. The method of claim 1, wherein initiating the dialog session with the user via the client device, and determining the one or more further content parameters based on the on the one or more user inputs during the dialog session is further in response to:

determining that a quantity of the content items in the corpus of content items exceeds a threshold quantity.

6. The method of claim 1, wherein the corpus of content items includes content items unviewed by the user, and wherein using the content agent to render the given content comprises prioritizing the content items unviewed by the user in selecting the given content from the corpus of content items.

7. The method of claim 1, further comprising:

subsequent to using the content agent to render the given content that conforms to the initial content parameters and to the further content parameters:

receiving one or more user feedback signals indicating whether or not the user interacted with the given content; and updating the content agent based on the one or more user feedback signals.

8. The method of claim 7, wherein the one or more user feedback signals include a positive feedback signal indicating the user interacted with the given content.

9. The method of claim 7, wherein the one or more user feedback signals include a negative feedback signal indicating the user did not interact with the given content.

10. A client device, comprising:

memory storing instructions; and one or more processors configured to execute the instructions to:

receive a request for content, the request for content generated based on input of a user via one or more user interface input devices of the client device;

determine one or more initial content parameters based on the request;

determine that a corpus of content items are responsive to the initial content parameters;

in response to determining that the corpus of content items are responsive to the initial content parameters:

initiate a dialog session with the user via the client device, and determine one or more further content parameters based on one or more user inputs during the dialog session, the further content parameters refining the request and restricting the quantity of the content items of the corpus that are responsive to the request;

automatically determine, based on the request for content and/or based on sensor data from the client device, one or more contextual conditions present at the time of the request;

generate a content agent based on the initial content parameters associated with the request and the further content parameters determined based on the user inputs during the dialog session;

correlate the content agent with the one or more contextual conditions; and subsequent to generating the content agent:

determine an additional request for content, the additional request for content generated based on additional input of the user;

determine an additional instance of occurrence, at the time of the additional request, of the one or more contextual conditions;

in response to the additional request for content and based on the content agent being correlated with the one or more contextual conditions:

use the content agent to render given content that conforms to the initial content parameters and to the further content parameters.

11. The client device of claim 10, wherein the one or more contextual conditions include the user being engaged in a particular activity at the time of the request.

12. The client device of claim 11, wherein the instructions for causing the client device to generate the content agent based on the initial content parameters associated with the request and the further content parameters determined based on the user inputs during the dialog session comprises:

generate, based on the one or more contextual conditions and one or more features of the one or more of the content items in the corpus of content items, a prompt that is tailored to the one or more contextual conditions and the one or more features of the one or more content items in the corpus of content items.

13. The client device of claim 12, wherein the additional input of the user includes the prompt that is tailored to the one or more contextual conditions and the one or more features of the one or more content items in the corpus of content items.

14. The client device of claim 10, wherein the instructions for causing the client device to initiate the dialog session with the user via the client device, and to determine the one or more further content parameters based on the on the one or more user inputs during the dialog session further comprise:

determine that a quantity of the content items in the corpus of content items exceeds a threshold quantity.

15. The client device of claim 10, wherein the corpus of content items includes content items unviewed by the user, and wherein the instructions for causing the client device to use the content agent to render the given content comprises prioritizing the content items unviewed by the user in selecting the given content from the corpus of content items.

16. The client device of claim 10, wherein the instructions further comprise:

subsequent to using the content agent to render the given content that conforms to the initial content parameters and to the further content parameters:

receive one or more user feedback signals indicating whether or not the user interacted with the given content; and update the content agent based on the one or more user feedback signals.

17. The client device of claim 16, wherein the one or more user feedback signals include a positive feedback signal indicating the user interacted with the given content.

18. The client device of claim 16, wherein the one or more user feedback signals include a negative feedback signal indicating the user did not interact with the given content.

* * * * *